United States Patent
Boss et al.

(10) Patent No.: US 7,689,595 B2
(45) Date of Patent: Mar. 30, 2010

(54) AUTOMATIC TRAVEL CONTENT CAPTURE TOOL FOR ADDRESS BOOK ENTRIES

(75) Inventors: Gregory J. Boss, American Fork, UT (US); James R. Doran, New Milford, CT (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 11/755,064

(22) Filed: May 30, 2007

(65) Prior Publication Data

US 2008/0301144 A1 Dec. 4, 2008

(51) Int. Cl.
G06F 17/30 (2006.01)
G06F 7/00 (2006.01)
(52) U.S. Cl. .................................................. 707/104.1
(58) Field of Classification Search ............... 707/104.1
See application file for complete search history.

(56) References Cited

U.S. PATENT DOCUMENTS

| | | | |
|---|---|---|---|
| 5,771,280 | A | 6/1998 | Johnson |
| 5,842,009 | A | 11/1998 | Borovoy et al. |
| 5,946,687 | A | 8/1999 | Gehani et al. |
| 6,263,276 | B1 * | 7/2001 | Yokoyama et al. .......... 701/207 |
| 6,622,087 | B2 * | 9/2003 | Anderson ................... 701/209 |
| 2002/0082771 | A1 * | 6/2002 | Anderson ................... 701/209 |
| 2002/0161577 | A1 * | 10/2002 | Smith ......................... 704/233 |
| 2004/0024811 | A1 * | 2/2004 | Kitada et al. ................ 709/203 |
| 2004/0100460 | A1 | 5/2004 | Yamada et al. |
| 2005/0027442 | A1 | 2/2005 | Kelley et al. |
| 2005/0114021 | A1 | 5/2005 | Krull et al. |
| 2005/0251331 | A1 | 11/2005 | Kreft |
| 2007/0067098 | A1 * | 3/2007 | Zelentsov ................... 701/208 |
| 2007/0150188 | A1 * | 6/2007 | Rosenberg .................. 701/211 |

OTHER PUBLICATIONS

Smith, et al., "Mobile Image Capture and Management", JCDL '04; Jun. 7-11, 2004; p. 417.

* cited by examiner

*Primary Examiner*—Kuen S Lu
(74) *Attorney, Agent, or Firm*—Scully, Scott, Murphy & Presser, P.C.; Carl Lanuti

(57) ABSTRACT

A method of and system for capturing and updating travel directions in a user's local address book application. The method comprises the steps of determining a current location profile of the user, calculating a user trajectory using that profile and an intended destination, and adding the current location profile and the intended destination into a historical database. The user's local address book is checked for an entry for the address of said intended destination; and if that entry is not in the address book, the entry is created in the address book. That entry is then checked to determine if a direction/map field of the entry contains directions/map information. If the entry does not contain this information, then this information is mined from a network source and added to the address book. This direction/map information is then displayed.

5 Claims, 2 Drawing Sheets

AUTOMATIC TRAVEL CONTENT CAPTURE TOOL FOR ADDRESS BOOK ENTRIES

BACKGROUND OF THE INVENTION

1. Field of the Invention

This invention generally relates to downloading travel directions over the Internet. More specifically, the invention relates to capturing and updating travel directions in a user's address book application.

2. Background Art

Currently, the method of downloading directions from Internet service providers specializing in maps and directions is a manual process. These directions and maps can be placed into a PC or hand held based devices for immediate use, however, as target/arrival locations change, such directions and maps have to be manually "re-downloaded" to account for these travel adjustments. Additionally, it is a time consuming task, which is neglected often because a user was not able to anticipate the need for directions due to unexpected location changes. Moreover, storage of these directions and maps is cumbersome and lacks portability.

Known solutions to this problem are manual and involve a manual search for directions and maps using Internet service providers such as MapQuest, Mapblast, GIS, etc. These directions are downloaded and placed into a temporary location on a PC or handheld device. Also, directions and maps can be printed for future use, but are very static and cannot change as travel plans change. Map applications exist, such as MS Street and Trips 2004, etc., that can be used to determine directions, but the process of entering departure and arrival locations is manual. These directions and maps can be manually placed into address books in comment style fields, but are static until they are manually updated by invoking the manual process noted above.

Additionally, GPS mapping software common in some vehicles (Hertz Neverlost for example) allows for some dynamic updating of map and directions based upon the user's current location. In such device installations, if a user unexpectedly changes their location from the intended course, the GPS system will recalculate and redisplay a new map with directions based upon the new known location. These navigation systems have to be operating in a real-time mode and can only recalculate based on current location as opposed to calculating a future or anticipated location in an off-line mode.

The drawbacks to known solutions are clear since the various processes are manual. Also, the lack of intelligent address books adds to the problem and becomes a solution roadblock for implementing an automatic system and method.

SUMMARY OF THE INVENTION

An object of this invention is to capture travel directions in a user's address book application by automatically downloading related content from various Internet travel service providers.

Another object of the present invention is to update directions/map documents in users' address book applications based upon their published calendar data and/or real-time location.

A further object of the invention is to enhance address book technology by leveraging the capabilities of Internet based travel service providers and non-Internet based travel applications as well as GPS to determine the current location profile of a user.

These and other objectives are attained with a method of and system for capturing and updating travel directions in a user's local address book application. The method comprises the steps of determining a current location profile of the user, calculating a user trajectory using said current location profile and an intended destination, and adding said current location profile and said intended destination into a historical database. The user's local address book is checked for an entry for the address of said intended destination; and if said entry for the address of said intended destination is not in the user's local address book, said entry is created in the local address book.

That entry is then checked to determine if a direction/map field of the entry contains directions/map information. If the entry does not contain that directions/map information, then this information is mined from a network source and added to the local address book. This direction/map information is then displayed.

In accordance with the preferred embodiment of the invention, the feature of a user location profile is introduced using methods such as, but not limited to, global positioning systems (GPS). The current location of the user is automatically determined and used to "plot" travel trajectories based on intended destination. Based on the entry of an intended destination, an intelligent address book uses the current location profile and potential destination as noted in the address book to plot a travel trajectory. This simple point-to-point trajectory is expanded to include directions and maps already stored locally if available (hand held personal data assistants and laptop computers may benefit the most from the system of this invention). If detailed trajectories are not available, the system will automatically download these directions from an Internet travel service provider, such as MapQuest, based on current location profile and intended destination. Once the directions and maps are placed into the intelligent address book, the user is then able to travel to the intended destination without manual intervention. Additionally, if the intended destination is changed to another entry in the intelligent address book, or to a new location entirely, the system will automatically re-calculate and populate all required address book map and direction entries accordingly.

In the preferred embodiment, such directions and maps are stored for future use. If an Internet travel service provider were not available, the system and method would use any local travel application, such as MS Streets and Trips.

Also, in the preferred embodiment, the present invention provides and uses a link between the user's calendar information and the user's address book. The system periodically or based upon an event (change, add, delete) from within the user's calendar, update all the relevant address book entries with directions from the anticipated location published in the calendar to each address published in the address book. Relevant address book entries are determined by a user profile setting. This is a filter or preference the users set, which is based upon the distance from the current or anticipated location published in the calendar to any address book entry. This can be measured by mileage or zip code, or any other locational metric.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
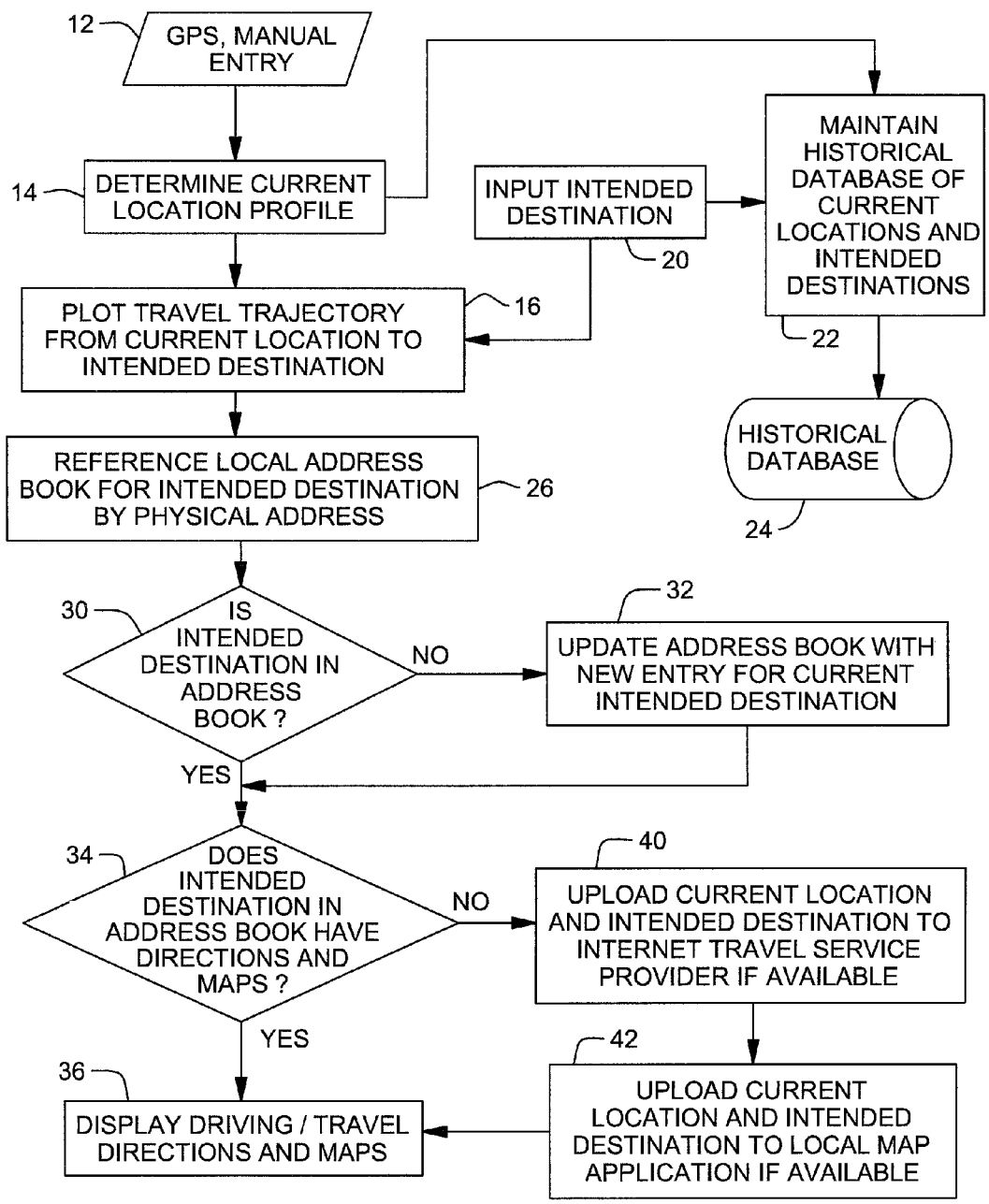
FIG. 1 shows a preferred method for implementing the present invention.

The present invention provides a method and system for capturing and updating travel directions in a user's address book application. Generally, in the invention, the feature of a user location profile is introduced using methods such as, but not limited to, global positioning systems (GPS). The current location of the user is automatically determined and used to "plot" travel trajectories based on intended destination. Based on the entry of an intended destination, an intelligent address book uses the current location profile and potential destination as noted in the address book to plot a travel trajectory. This simple point-to-point trajectory is expanded to include directions and maps already stored locally if available (hand held personal data assistants and laptop computers may benefit the most from the system of this invention). If detailed trajectories are not available, the system will automatically download these directions from an Internet travel service provider, such as MapQuest, based on current location profile and intended destination. Once the directions and maps are placed into the intelligent address book, the user is then able to travel to the intended destination without manual intervention. Additionally, if the intended destination is changed to another entry in the intelligent address book, or to a new location entirely, the system will automatically re-calculate and populate all required address book map and direction entries accordingly.

In the preferred embodiment, such directions and maps are stored for future use. If an Internet travel service provider is not available, the system and method would use any local travel application, such as MS Streets and Trips.

Also, in the preferred embodiment, the present invention provides and uses a link between the user's calendar information and the user's address book. The system periodically or based upon an event (change, add, delete) from within the users calendar, update all the relevant address book entries with directions from the anticipated location published in the calendar to each address published in the address book. Relevant address book entries are determined by a user profile setting. This is a filter or preference the users set, which is based upon the distance from the current or anticipated location published in the calendar to any address book entry. This can be measured by mileage or zip code, or any other locational metric.

Following is an example:

A user publishes to his/her calendar for Jan. 2, 2007 the following entries:

| | |
|---|---|
| 9:00 am-9:30 am | Travel to LAX airport |
| 10:54 am-12:30 pm | AA Flight 1234 to Chicago |
| 2:00 pm-4:31 pm | AA Flight 4321 to JFK, New York |

-continued

| | |
|---|---|
| 5:00 pm-5:30 pm | Check-in Hotel A |
| 6:00 pm-7:00 pm | Dinner with client, Generic Restaurant B in White Plains, New York |

Upon saving the entries listed above, a program looks up the known locations for each entry (LAX, Chicago, JFK, Generic Hotel A, Restaurant B). Further the user's travel directions profile indicates a default setting of 50 miles. The program now calculates the distance between the five known locations and every address in the user's address book. For every address within 50 miles of LAX, the program will add directions and map data to that address book entry. It will also do this for every address within 50 miles of Chicago, JFK, Hotel A and Restaurant B. Then when the user travels to Hotel A, he/she may decide to look up someone that lives near Hotel A. When this is done, he/she will discover directions from Hotel A to Address Book Entry X already published. Later that day, after finishing dinner with the client at Restaurant B, the user may decide to look up another contact and upon doing so, discovers the directions from Restaurant B to Address Book Contact Y's location is already published.

This system then stores N+Y sets of directions, where N is the number of calendar entries and Y is the number of address book entries which are within the specified distance of the anticipated location. All sets of directions can be stored for future use and are initially created upon a regularly run schedule or event based trigger. For example, every time a calendar entry or address book entry is added or modified, the system will update the appropriate address book entries with directions and map data.

The travel directions' profile setting can be global or individually set for each calendar or address book setting. For instance, the example above may be used to indicate individual preference per calendar entry:

| | |
|---|---|
| 9:00 am-9:30 am<br>10 miles | Travel to LAX airport |
| 10:54 am-12:30 pm<br>10 miles | AA Flight 1234 to Chicago |
| 2:00 pm-4:31 pm<br>20 miles | AA Flight 4321 to JFK, New York |
| 5:00 pm-5:30 pm<br>50 miles | Check-in Hotel A |
| 6:00 pm-7:00 pm<br>60 miles | Dinner with client, Generic Restaurant B in White Plains, New York |

In this scenario, the filter for each anticipated location is different. Any address book entry that is within 10 miles of LAX will be populated with directions and a map. However, any address book entry within 50 miles of Hotel A will be populated with directions and a map. This allows for more flexible and realistic travel options depending upon the length of time a user will be at a particular destination. Alternatively, the system could be configured to automatically determine the distance based upon some preset preferences. For example, it is reasonable to assume that if a user will only be at the Chicago airport for a two-hour layover, he/she will not attempt to visit any person in his address book more than 30 minutes from the airport. Likewise, if a person's anticipated location is a hotel for three days, the system could automatically extend the range of address book entries to several hundred miles.

A preferred embodiment may include automatic update of travel routes, directions, and maps, given a user's historical travel patterns and/or physical changes in routes due to road construction and travel delays.

As a general note, this invention is described in terms of enhancements to address book technology and leverages the capabilities of internet based travel service providers and non-internet based travel applications as well as GPS to determine the current location profile.

FIG. 1 shows the detailed process for the preferred method described herein. Data from a GPS or manual entry is used, as represented at 12 and 14, to determine the current location profile. This information is fed into a sub-process 16 to calculate the trajectory based upon an intended destination, represented at 20. At the same time, the current location profile is, at 22, also fed into a historical database 24 along with the intended destination for pattern recognition noted further below in FIG. 2. Once the begin and end destinations are understood, the process then, at 26, checks the local address book for the address of the intended destination.

If, at 30, the intended destination is not in the local address book, an entry is created, at 32, with the address. If, at 30, the intended destination is already in the address book, the process then, at 34, checks to see if the "directions/map" field contains information. If so, that information is displayed at 36. If not, the information is mined, at 40, from either the Internet using an Internet travel service provider like MapQuest, or it is mined from a locally installed map location program like MS Street and Trips. Directions are calculated and loaded, at 42, into the local address book for future use and displayed to the user.

Figure 2:
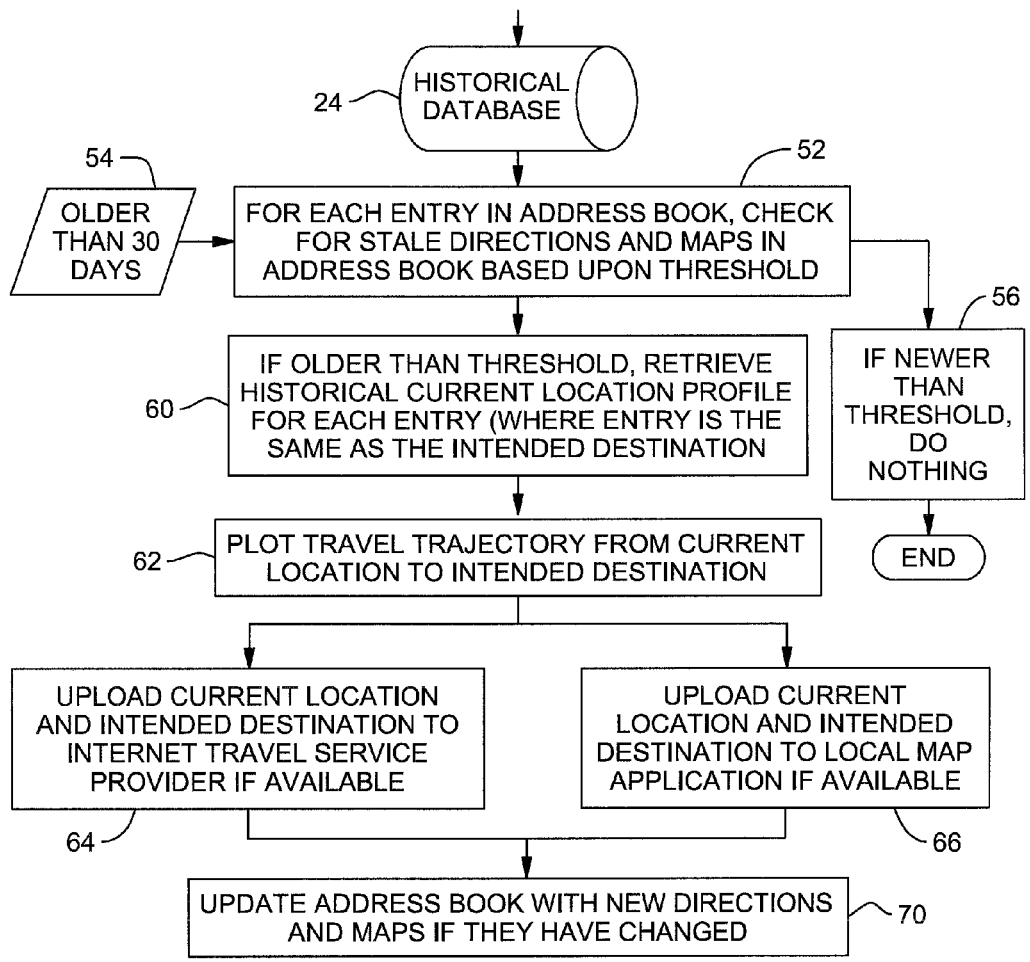
FIG. 2 shows a scheduled update process that may be used in this invention.

FIG. 2 teaches the scheduled update process. The historical database 24 is used to update the address book for directions and maps. Periodically, at 52, the address book is scanned for entries that have not been updated since a predefined and programmable threshold 54, e.g. thirty days. If an entry is newer than this threshold, then, as represented at 56, no update is made.

However, any entry in the address book that has not been changed in thirty days is checked and the historical database is used, at 60, to gather the current location profile for that entry based on statistical information, e.g. frequency of use of that location profile. Using that current location profile for that entry (where each entry in the address book is the "intended destination" as noted in FIG. 1), a trajectory is plotted, at 62, and uploaded, at 64, to Internet travel service providers like Mapblast or uploaded, at 66, to local travel applications like Randall Street Atlas to determine the directions. If the directions are the same, the process ends for that entry. If the directions are different, then they are updated, at 70, accordingly for each entry in the address book. The process is repeated for each entry in the address book.

As will be readily apparent to those skilled in the art, the present invention, or aspects of the invention, can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

Figure 3:
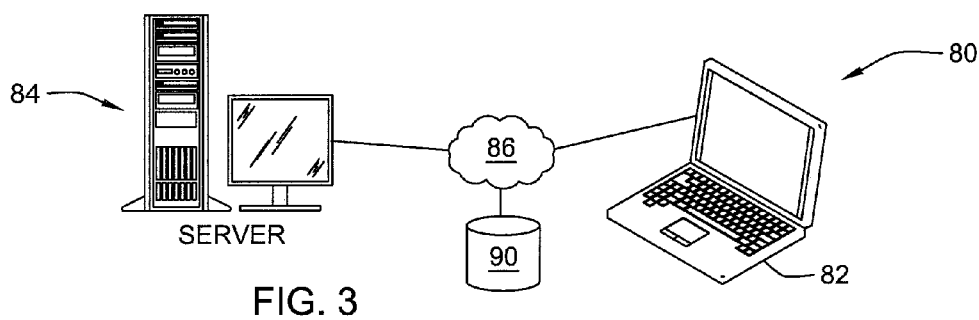
FIG. 3 illustrates a laptop computer that may be used in the practice of the invention.

For instance, FIG. 3 shows a laptop computer 80 that may be employed in the implementation of this invention. Laptop computer 80 includes a Processing unit 82, which houses a processor, memory and other system components that implement a general purpose processing system that may execute a computer program product comprising media, for example a floppy disc that may be read by the processing unit a through floppy drive. The program product may also be stored on hard disk drives within the processing unit or may be located on a remote system such as a server 84.

As shown in FIG. 3, laptop computer 80 is connected to the Internet 86; and this connection may be made in any suitable way, including a wireless connection. FIG. 3 also shows a server 84 and a database 90, which may be used in the implementation of this invention. Server 84 represents the Web site servers that may be accessed in the course of the present invention to download to computer 80 the desired maps and/or travel directions.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of capturing and updating travel directions in a user's local address book application, wherein the address book application includes addresses for a multitude of locations, the method comprising the steps of:
   determining a current location profile of the user;
   calculating a user trajectory using said current location profile, an intended final destination, and a plurality of intermediate destinations between a current location of the user and said intended final destination;
   adding said current location profile and said intended destination into a historical database;
   checking the user's local address book for an entry for the address of said intended destination;
   if said entry for the address of said intended destination is not in the user's local address book, then creating said entry in the local address book, said entry including a directions and map field;
   checking to determine if the directions and map field of said entry contains directions and map information;
   if said entry does not contain said directions and map information, then mining said information from a network source, and adding said mined information into the local address book; and
   displaying said directions and map information; and
   for each of the intermediate destinations, identifying all of said multitude of locations in the address book within a specified distance of said each intermediate destination; and for each of said identified locations in the address book, adding to the address book directions and a map to said each identified location from said each intermediate destination.

2. A method according to claim 1, comprising the further step of updating the local address book by using the historical database.

3. A method according to claim 2, wherein the step of updating the local address book includes the steps of:
periodically scanning the address book for entries that have not been updated since a predefined and programmable threshold;
for each entry in the address book that has not been changed since said predefined and programmable threshold;
using the historical database to gather the current location profile for the entry;
plotting a trajectory for the entry by using the current location profile for the entry;
uploading said trajectory to an Internet travel service provider to determine directions for the entry; and
if said determined directions are different than the directions in the entry, then adding said determined directions to said entry.

4. A method according to claim 3, wherein the step of using the historical database includes the step of gathering the current location profile for the entry based on the frequency of use of that location profile.

5. The method according to claim 3, wherein said specified distance is determined, for each of the intermediate destinations, based on a specified amount of time the user intends to stay at said each intermediate destination.

* * * * *